Patented July 15, 1941

2,249,054

UNITED STATES PATENT OFFICE 2,249,054

CHROMANES AND METHOD OF PRODUCING THE SAME

Lee Irvin Smith and Herbert E. Ungnade, Minneapolis, Minn., assignors to Regents of The University of Minnesota, Minneapolis, Minn., a corporation of Minnesota No Drawing. Application May 31, 1938, Serial No. 211,077

7 Claims. (Cl. 260—333)

This invention relates to chromanes and to processes for producing the same. In our application Serial Number 211,078 entitled Coumaranes and chromanes and method of producing the same, filed concurrently herewith, we have described processes for producing coumaranes and chromanes in which allylic halides are used as starting ingredients. We have also discovered that certain of these compounds, namely, the chromanes, may be produced by other procedures.

We have found that when compounds of the diene type are reacted with hydroquinone compounds, such as hydroquinone derivatives or substituted hydroquinones, for example the hydroquinone monoethers, all having vacant at least one position ortho to the hydroxyl group, chromane compounds are produced and it is accordingly an object of the invention to provide such a method of manufacture.

The diene reaction material utilized in our invention may be derived by simple reactions from alcohols and we have made the further discovery that if desired the production of such diene materials may be caused to take place simultaneously in the reaction in which it is used, along with the hydroquinone compound, in the production of the new products of this invention. It is therefore a further object to provide these useful methods for producing the products of this invention.

It is a further object of the invention to utilize any exhibited effect of the herein described processes and/or products and to utilize such processes and/or products in any of their known or hereinafter discovered capacities.

Other and further objects are those inherent and implied by the processes and products hereinafter described and claimed.

According to one of the methods of the present invention dienes or compounds presenting the diene linkage, such as dimethyl butadiene, isoprene or phytadiene may be reacted with hydroquinone compounds such as hydroquinone derivatives, substituted hydroquinone, hydroquinone monoethers or the like, all having vacant at least one position ortho to the hydroxyl group to produce the new products of the present invention. The reaction is preferably carried out in the presence of an acid catalyst which may be an organic acid such as formic acid, acetic acid, a substituted organic acid such as halogenated acetic acid, inorganic acids such as sulphuric or phosphoric, or acidic organic or acidic inorganic salts such as the amine salts, aluminum chloride, zinc chloride, mercuric chloride, acid sulfates, or boron trifluoride.

This method is illustrated by the following specific examples which are to be considered merely as illustrative and not as limitations upon the invention.

Example I

A mixture of 8.2 grams of dimethylbutadiene, 12.4 grams hydroquinone monomethylether and 1 gram mercuric chloride is reacted by heating first in a water bath and then on a wire gauze until the temperature of the liquid reaches 240° C. Heating is then stopped completely and the reaction mixture is permitted to cool.

The mechanism of the reaction between the hydroquinone monomethylether and the dimethyl butadiene and the structure of the resultant product 2-2-3 trimethyl 6 methoxy chromane are believed to be as follows:

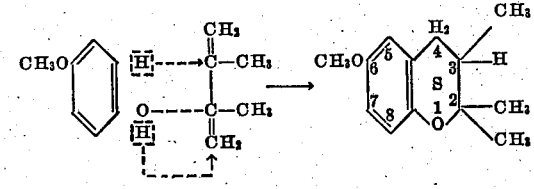

The crude reaction product, which is a viscid brown mass, is then dissolved in ethyl ether and the ether solution washed with Claisen's alkali (potassium hydroxide, methanol and water) and then with water. The ether layer which separates is then dried over calcium chloride and the ether is then distilled off. The residue which remains is a crude dark colored liquid. The crude liquid is then distilled in a high vacuum and yields a water white liquid product having a boiling point of 50–55° C. at $1 \times 10^{-6}$ mm. mercury pressure.

Example II

A mixture of 8.2 grams dimethyl butadiene and 12.4 grams hydroquinone monomethylether are dissolved in 10 grams glacial acetic acid. The mixture is saturated with dry hydrogen chloride at 0° C. and then allowed to react by standing in the cold for 18 hours.

The mechanism of this reaction and the structure of the resultant product are believed to be the same as that set forth in Example I. The reaction which is finished by warming in a steam bath, yields a dark oily substance. A solution of 40% KOH is then added while simultaneously cooling. The mixture is then washed with water, separated by the use of ether and purified, as in Example I. The final product is a water white oil. This compound is likewise 2-2-3 trimethyl 6 methoxychromane.

Example III

A mixture of 10 grams trimethylhydroquinone, 100 cc. glacial acetic acid and 1 gram zinc chloride is heated to 100° C. under efficient reflux at atmospheric pressure, and while refluxing 10 grams of isoprene is added. The hot mixture is permitted to stand and is then reacted by further refluxing. One drop of concentrated $H_2SO_4$ is then added and the refluxing continued for one hour.

The mechanism of the reaction between the trimethylhydroquinone and isoprene and the structure of the resultant product 2-2-5-7-8 pentamethyl 6 hydroxychromane are believed to be as follows:

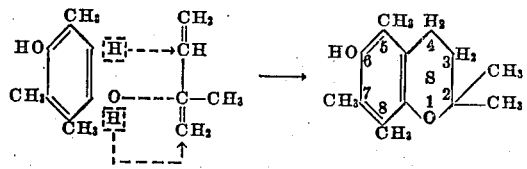

The reaction mixture is then permitted to cool and is then poured into water. A solid which forms is filtered out and recrystallized from dilute ethyl alcohol. The yield is about 7 grams of crystals having a melting point of 94–94.5° C.

Example IV

When phytadiene (the diene corresponding to the alcohol, phytol, of chlorophyll) is substituted for the dimethyl butadiene of Example I, a reaction similar to that therein set forth occurs.

Trimethylhydroquinone (0.5 g.) and phytadiene (2 g.) are dissolved in a mixture of formic acid (5 g.) and acetic acid (2 g.) and the solution was refluxed for six hours. The mixture should then be cooled, poured into water, extracted with ether and the ether solution washed with water until the washings are neutral. The ether layer should then be dried over sodium sulphate, filtered and the ether evaporated. The crude product (2 g.) is a dark, viscous oil, which is believed to be alphatocopherol. The product boils at about 145° under $1 \times 10^{-6}$ m. m. which is the same as the boiling point of the product obtained in Example III of our application, Serial Number 211,078 filed concurrently herewith.

In any of the foregoing procedures the diene constituent may be produced as a preliminary step in the procedure or in situ in the principal reaction. Thus any alcohol, such as an allylic alcohol, or any compound which will produce a diene constituent either directly by the use of acid catalysts and/or heat, or after rearrangement in the presence of acids and/or by heating, may be used in this synthesis. Thus for the source of the diene constituent we may use an ene-ol e. g., an aliphatic alcohol in which at least one double bond is present such as primary allylic alcohols having the general structure

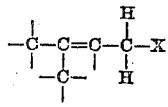

or tertiary allylic alcohols having the general structure

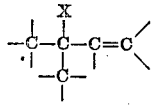

in which X may be either a hydroxyl group or a substituted halogen. Or as the source of the diene constituent we may likewise use a dihydric alcohol such as the 1,2 diols having the general structure

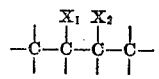

or the 1,3 diols having the general structure

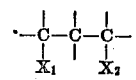

where either $X_1$ or $X_2$ or both may be a hydroxyl group or halogen.

In carrying out the invention according to this procedure the selected diene yielding compound is substituted for the diene constituent and the reaction carried out as before in the presence of an acid dehydrating catalyst or by heating. As the diene is formed it reacts with the hydroquinone compound to form the products of this invention which are thereafter separated and purified as set forth in the foregoing examples.

Example V

When nerolidol, which is described by Beilstein, volume 1, page 464, and otherwise known as the allylic isomer of tetrahydrofarnesol, having the structure.

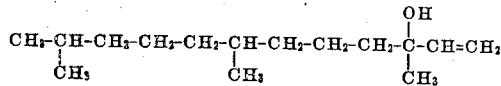

is substituted for the dienes of any of the foregoing examples, it is probably converted into a diene which immediately reacts with the hydroquinone compound to produce a chromane. As an example of this procedure the following is given: Trimethyl hydroquinone (1 g.) and nerolidol (5 g.) are dissolved in a mixture of formic acid (5 g.) the acetic acid (5 g.) and the solution refluxed for three hours. The product (2 g.) is isolated exactly as in Example IV and is a dark, viscous oil.

In each of the foregoing examples the hydroquinone compound used is either a substituted hydroquinone or a derivative of hydroquinone. Thus in Examples I and II the derivative hydroquinone, monomethylether was used and in Examples III, IV and V the substituted compound, trimethylhydroquinone was used.

Products made according to the process of the present invention are active antioxidants and may be used for the purposes for which antioxidants have heretofore been employed, and being structurally identified with the tocopherols, they are useful as such. The term "tocopherols" refers to naturally occurring substances having biological (vitamin E) activity. The term was introduced into the literature by Evans, Emerson and Emerson, Journal of Biological Chemistry, volume 113, page 321, 1936.

Many and various modifications will suggest themselves to those skilled in the art and it is intended that these may be used in modification of the procedures and products herein set forth without departing from the spirit of the invention described and claimed.

We claim:

1. A process for the production of tocopherol-like compounds which comprises reacting an aromatic compound containing a free hydroxyl group and an unsubstituted position ortho to said hydroxyl group and selected from the group consisting of alkyl-substituted-para-dihydroxy benzenes and their mono ethers, with a $\Delta^{1,2}$, $\Delta^{3,4}$ diene, in the presence of an acidic substance.

2. A process for the production of tocopherol-like compounds which comprises reacting an aromatic compound containing a free hydroxyl group and an unsubstituted position ortho to said hydroxyl group and selected from the group consisting of alkyl-substituted-para-dihydroxy benzenes and their mono ethers, with isoprene, in the presence of an acidic substance.

3. A process for the production of tocopherol-like compounds which comprises reacting an aromatic compound containing a free hydroxyl group and an unsubstituted position ortho to said hydroxyl group and selected from the group consisting of alkyl-substituted-para-dihydroxy benzenes and their mono ethers, with phytadiene, in the presence of an acidic substance.

4. A process for the production of tocopherol-like compounds which comprises reacting trimethylhydroquinone, with a $\Delta^{1,2}$, $\Delta^{3,4}$ diene, in the presence of an acidic substance.

5. A process for the production of tocopherol-like compounds which comprises reacting trimethylhydroquinone mono-methyl-ether, with a $\Delta^{1,2}$, $\Delta^{3,4}$ diene, in the presence of an acidic substance.

6. A process for the production of tocopherol-like compounds which comprises reacting trimethylhydroquinone with isoprene in the presence of an acidic substance.

7. A process for the production of tocopherol-like compounds which comprises reacting trimethylhydroquinone with phytadiene in the presence of an acidic substance.

LEE IRVIN SMITH.
HERBERT E. UNGNADE.